US012526146B2

(12) United States Patent
Mamidi et al.

(10) Patent No.: US 12,526,146 B2
(45) Date of Patent: Jan. 13, 2026

(54) SYSTEM AND METHOD FOR ALTERED DATA GENERATION AND TRANSIENT USE VIA ELECTRONIC ARRANGEMENT PROTOCOLS

(71) Applicant: BANK OF AMERICA CORPORATION, Charlotte, NC (US)

(72) Inventors: Naveen Reddy Mamidi, Telangana (IN); Varun Vidyadharan Ezhava, Telangana (IN); Maneesh Kumar Sethia, Telangana (IN); Sidharth Singh, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 90 days.

(21) Appl. No.: 18/645,493

(22) Filed: Apr. 25, 2024

(65) Prior Publication Data

US 2025/0337575 A1 Oct. 30, 2025

(51) Int. Cl.
*H04L 9/32* (2006.01)
*G06F 16/25* (2019.01)
*H04L 9/00* (2022.01)
*H04L 67/02* (2022.01)

(52) U.S. Cl.
CPC .......... *H04L 9/3213* (2013.01); *G06F 16/258* (2019.01); *H04L 9/50* (2022.05); *H04L 67/02* (2013.01)

(58) Field of Classification Search
None
See application file for complete search history.

(56) References Cited

U.S. PATENT DOCUMENTS

| | | | |
|---|---|---|---|
| 6,931,572 B1 | 8/2005 | Schubert et al. | |
| 9,612,941 B1* | 4/2017 | Bitar | G06F 11/3684 |
| 2008/0222246 A1 | 9/2008 | Ebling et al. | |
| 2011/0184575 A1 | 7/2011 | Kawamoto et al. | |
| 2012/0159518 A1 | 6/2012 | Boliek et al. | |
| 2013/0318400 A1 | 11/2013 | Liang et al. | |
| 2021/0109941 A1* | 4/2021 | Canel Lopez | G06F 16/2358 |
| 2024/0195642 A1* | 6/2024 | Nowotny | H04L 9/3236 |
| 2025/0184119 A1* | 6/2025 | Han | G06N 3/0455 |

* cited by examiner

*Primary Examiner* — Lashonda Jacobs-Burton
(74) *Attorney, Agent, or Firm* — Moore & Van Allen PLLC; Andrew T. Wood

(57) ABSTRACT

Systems, computer program products, and methods are described herein for altered data generation and transient use via electronic arrangement protocols. The present disclosure includes retrieving data of a first database, aggregating the data with additional data to form an aggregated data object, tagging the aggregated data object with at least one summary tag, searching an electronic arrangement protocol repository to identify at least one electronic arrangement protocol related to the at least one summary tag, wherein the at least one electronic arrangement protocol may include a first electronic arrangement protocol rule, for a first element of the at least one summary tag, comprising instructions to alter identifiable information, fabricating synthetic data based on the aggregated data object using the at least one electronic arrangement protocol, generating and appending the non-fungible token to a distributed ledger.

20 Claims, 8 Drawing Sheets

SYSTEM AND METHOD FOR ALTERED DATA GENERATION AND TRANSIENT USE VIA ELECTRONIC ARRANGEMENT PROTOCOLS

TECHNOLOGICAL FIELD

Example implementations of the present disclosure relate to a system and method for altered data generation and transient use via electronic arrangement protocols.

BACKGROUND

In a digital landscape that includes diverse users and their data, it is important to cater to all user needs while also providing data privacy. To do so, comprehensive data is required for user behavior analysis, testing, and predictive modeling to enhance services and also prevent potential malicious activities. However, the use of customer data directly in such user behavior analysis, testing, and predictive modeling, raises concerns regarding data privacy, as such personal data may be mishandled or otherwise used by malicious actors. Additionally, the resource-intensive nature of generating test data compounds these challenges by requiring the consumption of a significant amount of storage space. Thus, there exists a pressing need for altered data generation and transient use via electronic arrangement protocols.

BRIEF SUMMARY

Systems, methods, and computer program products are provided for altered data generation and transient use via electronic arrangement protocols.

In one aspect, a system for altered data generation and transient use via electronic arrangement protocols is presented. The system includes a processing device, a non-transitory storage device containing instructions when executed by the processing device, causes the processing device to perform the steps of receiving a request for data of a predetermined type from a requestor, retrieving data of a first database from at least one data farm, aggregating, the data of the first database with additional data from at least one predetermined second database, to form an aggregated data object, tagging the aggregated data object with at least one summary tag corresponding to the aggregated data object, searching an electronic arrangement protocol repository to identify at least one electronic arrangement protocol related to the at least one summary tag, wherein the at least one electronic arrangement protocol may include a first electronic arrangement protocol rule, for a first element of the at least one summary tag, comprising instructions to alter identifiable information, and a second electronic arrangement protocol rule for the first element comprising instruction to generate a non-fungible token referencing the altered identifiable information, fabricating, as a result of executing the at least one electronic arrangement protocol on a distributed ledger, fabricated synthetic data comprising the altered identifiable information based on the aggregated data object, generating the non-fungible token, wherein the generated non-fungible token may include a representation of the fabricated synthetic data, and appending the non-fungible token to the distributed ledger.

In some implementations, the instructions further cause the processing device to perform the steps of storing, temporarily, the fabricated synthetic data at a data shelf, receiving a request to use the fabricated synthetic data, wherein the request may include instructions to remove the fabricated synthetic data from the data shelf, transmitting the fabricated synthetic data to the requestor, and removing the fabricated synthetic data from the data shelf.

In some implementations, the at least one summary tag further may include a second element.

In some implementations, the at least one electronic arrangement protocol further may include a third electronic arrangement protocol rule, the third electronic arrangement protocol rule comprising instructions to alter identifiable information of the second element.

In some implementations, aggregating may include mixing data of a plurality of data types.

In some implementations, transmitting the fabricated synthetic data to the requestor may include sending the fabricated synthetic data as data packets over an API call.

In some implementations, the fabricated synthetic data is encapsulated in a JSON data packet.

In another aspect, a computer program product for altered data generation and transient use via electronic arrangement protocols is presented. The computer program product includes a non-transitory computer-readable medium including code causing an apparatus to receive a request for data of a predetermined type from a requestor, retrieve data of a first database from at least one data farm, aggregate, the data of the first database with additional data from at least one predetermined second database, to form an aggregated data object, tag the aggregated data object with at least one summary tag corresponding to the aggregated data object, search an electronic arrangement protocol repository to identify at least one electronic arrangement protocol related to the at least one summary tag, wherein the at least one electronic arrangement protocol may include a first electronic arrangement protocol rule, for a first element of the at least one summary tag, comprising instructions to alter identifiable information, and a second electronic arrangement protocol rule for the first element comprising instruction to generate a non-fungible token referencing the altered identifiable information, fabricate, as a result of executing the at least one electronic arrangement protocol on a distributed ledger, fabricated synthetic data comprising the altered identifiable information based on the aggregated data object, generate the non-fungible token, wherein the generated non-fungible token may include a representation of the fabricated synthetic data, and append the non-fungible token to the distributed ledger.

In some implementations, the code further causes the apparatus to store, temporarily, the fabricated synthetic data at a data shelf, receive a request to use the fabricated synthetic data, wherein the request may include instructions to remove the fabricated synthetic data from the data shelf, transmit the fabricated synthetic data to the requestor, and remove the fabricated synthetic data from the data shelf.

In some implementations, the at least one summary tag further may include a second element.

In some implementations, the at least one electronic arrangement protocol further may include a third electronic arrangement protocol rule, the third electronic arrangement protocol rule comprising instructions to alter identifiable information of the second element.

In some implementations, aggregating may include mixing data of a plurality of data types.

In some implementations, transmitting the fabricated synthetic data to the requestor may include sending the fabricated synthetic data as data packets over an API call.

In some implementations, the fabricated synthetic data is encapsulated in a JSON data packet.

In yet another aspect, a method for altered data generation and transient use via electronic arrangement protocols is presented. The method includes receiving a request for data of a predetermined type from a requestor, retrieving data of a first database from at least one data farm, aggregating, the data of the first database with additional data from at least one predetermined second database, to form an aggregated data object, tagging the aggregated data object with at least one summary tag corresponding to the aggregated data object, searching an electronic arrangement protocol repository to identify at least one electronic arrangement protocol related to the at least one summary tag, wherein the at least one electronic arrangement protocol may include a first electronic arrangement protocol rule, for a first element of the at least one summary tag, comprising instructions to alter identifiable information, and a second electronic arrangement protocol rule for the first element comprising instruction to generate a non-fungible token referencing the altered identifiable information, fabricating, as a result of executing the at least one electronic arrangement protocol on a distributed ledger, fabricated synthetic data comprising the altered identifiable information based on the aggregated data object, generating the non-fungible token, wherein the generated non-fungible token may include a representation of the fabricated synthetic data, and appending the non-fungible token to the distributed ledger.

In some implementations, the method further includes storing, temporarily, the fabricated synthetic data at a data shelf, receiving a request to use the fabricated synthetic data, wherein the request may include instructions to remove the fabricated synthetic data from the data shelf, transmitting the fabricated synthetic data to the requestor, and removing the fabricated synthetic data from the data shelf.

In some implementations, the at least one summary tag further may include a second element.

In some implementations, the at least one electronic arrangement protocol further may include a third electronic arrangement protocol rule, the third electronic arrangement protocol rule comprising instructions to alter identifiable information of the second element.

In some implementations, aggregating may include mixing data of a plurality of data types.

In some implementations, transmitting the fabricated synthetic data to the requestor may include sending the fabricated synthetic data as data packets over an API call.

In some implementations, the fabricated synthetic data is encapsulated in a JSON data packet.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompanying drawings. The components illustrated in the Figures may or may not be present in certain implementations described herein. Some implementations may include fewer (or more) components than those shown in the Figures.

Figure 1A:
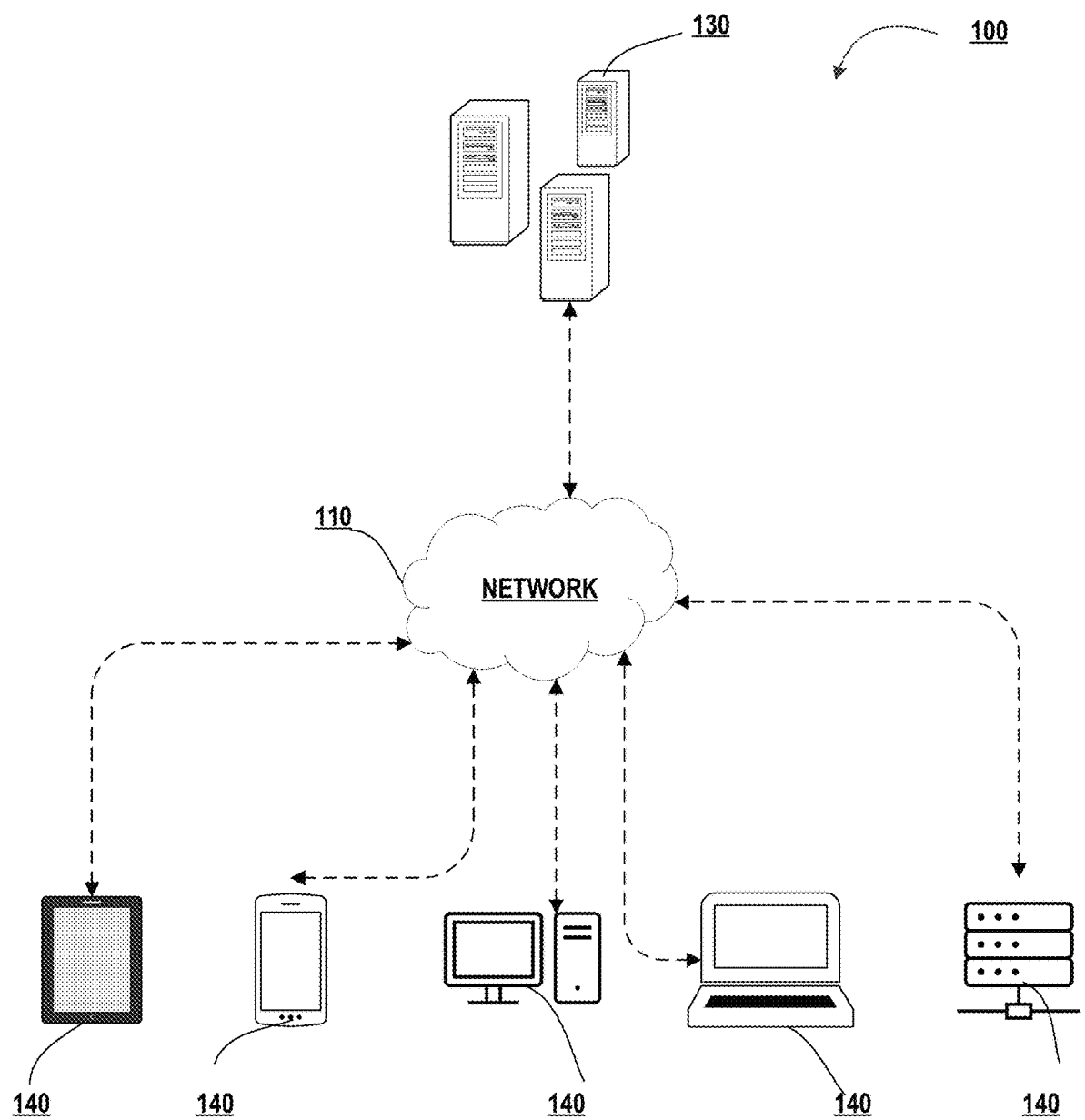
Figure 1B:
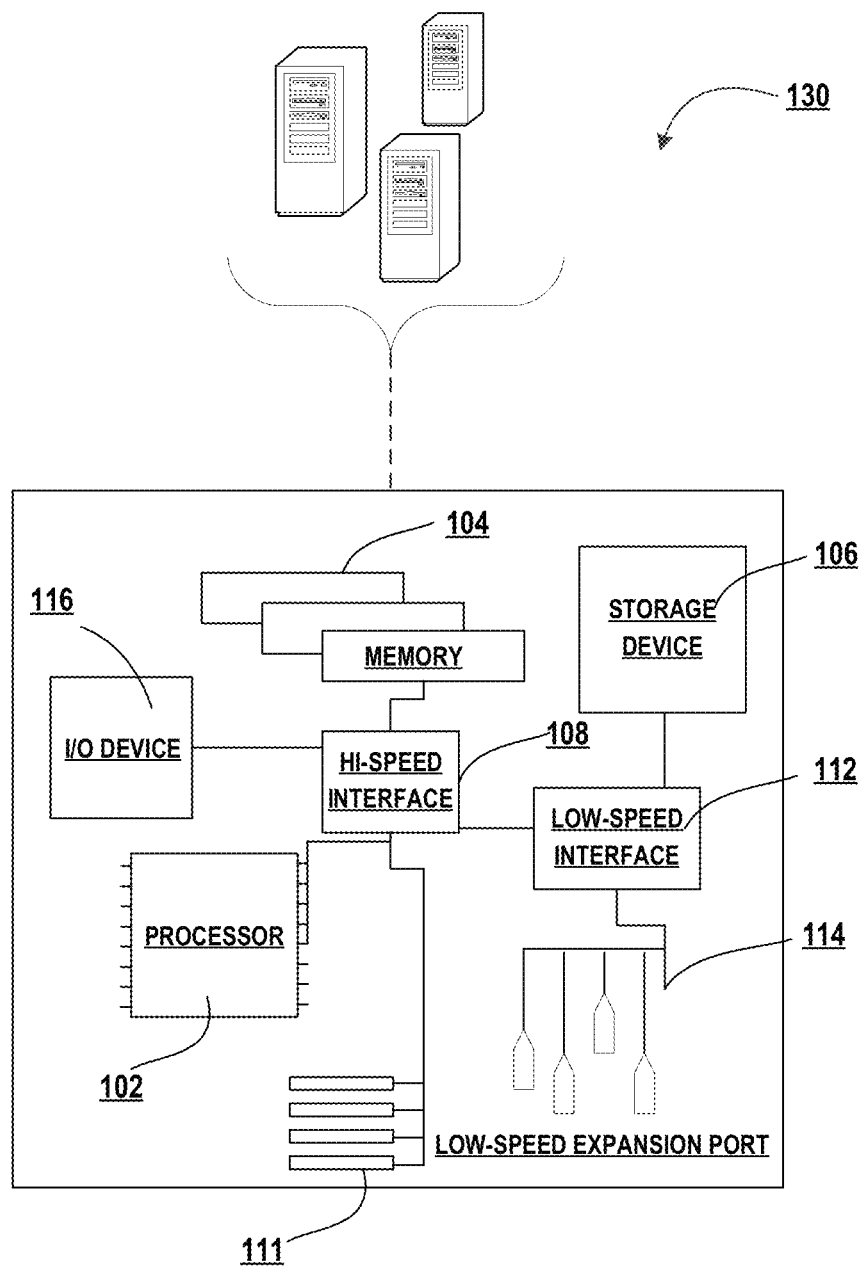
Figure 1C:
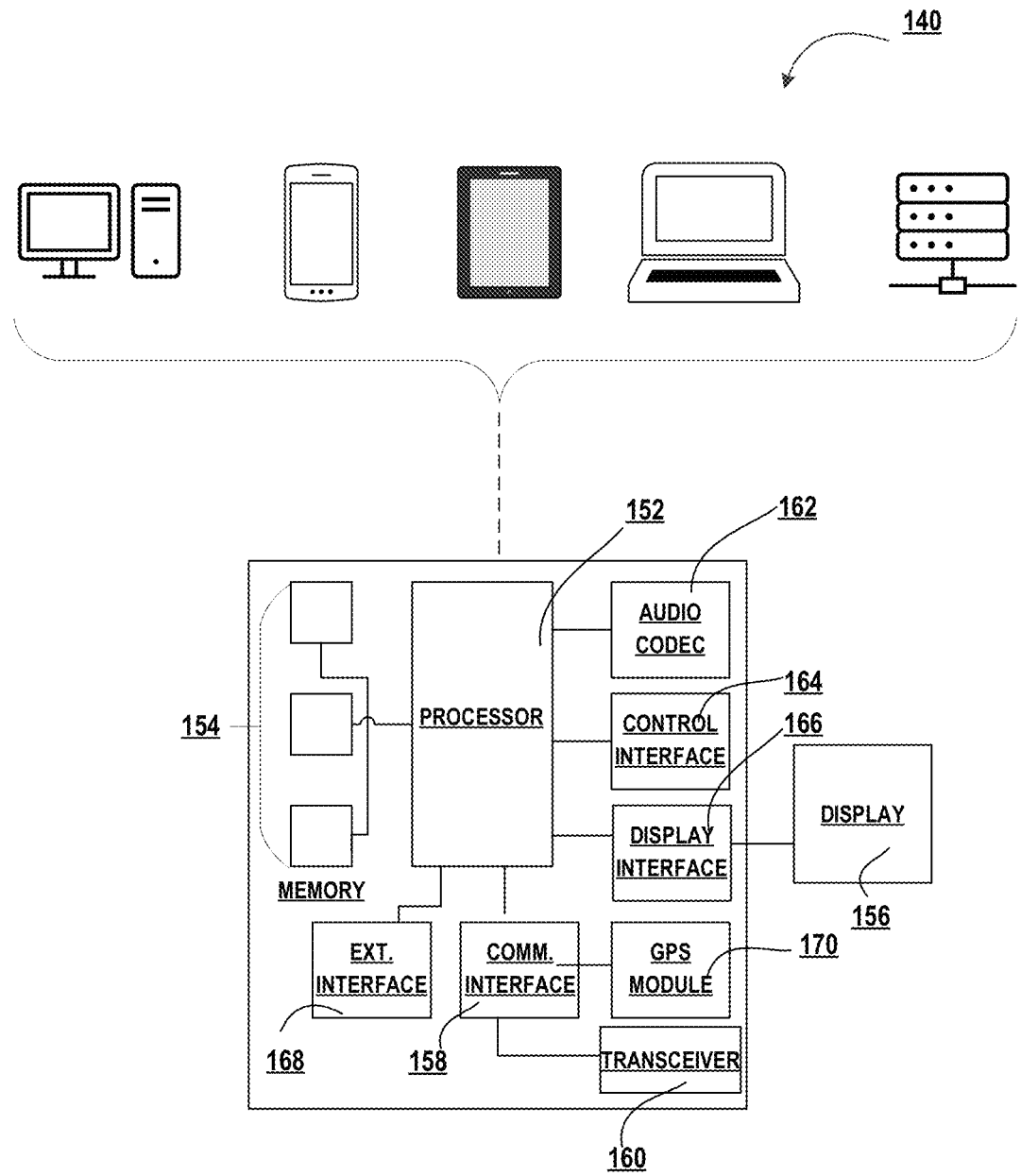
Figure 2A:
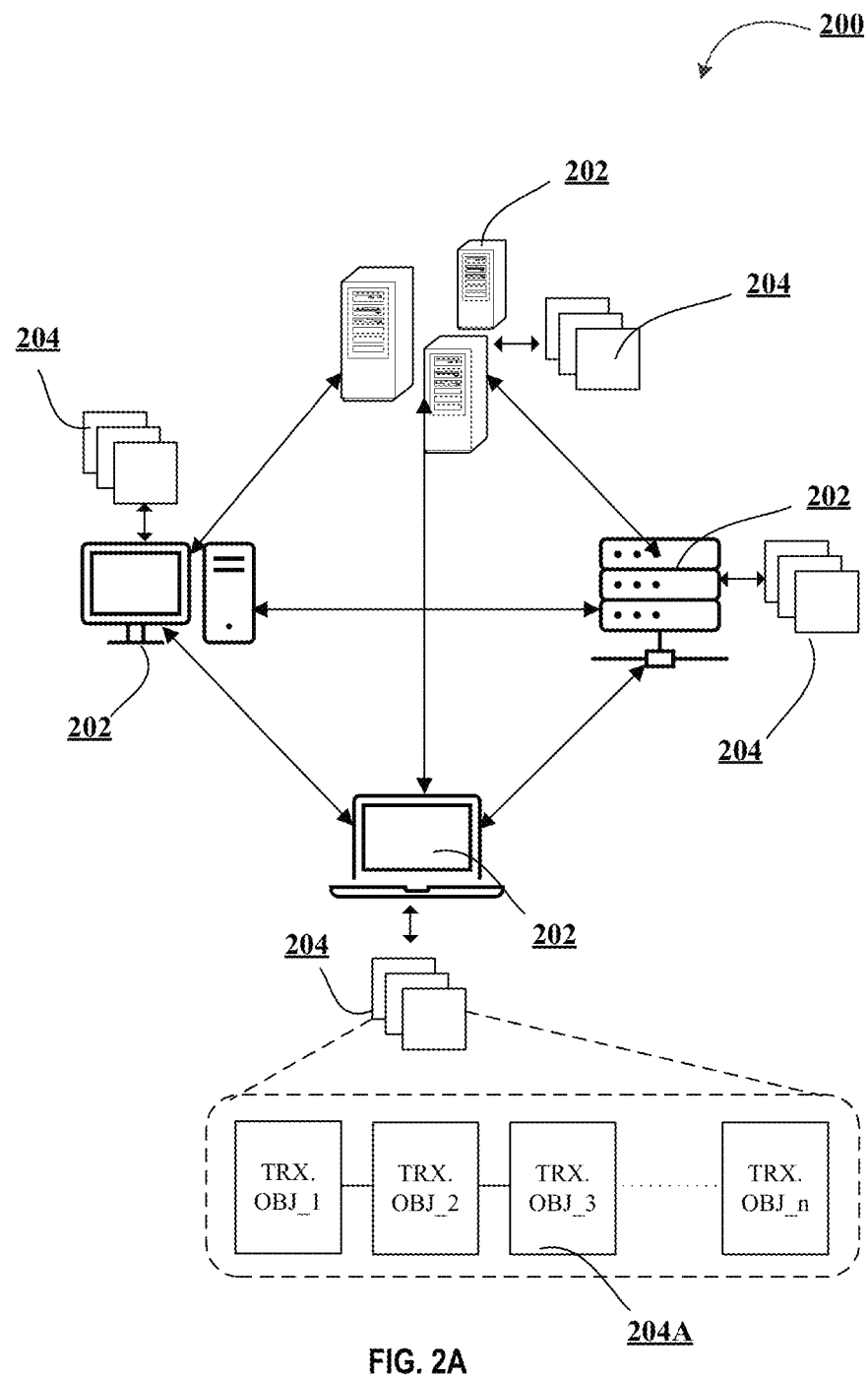
Figure 2B:
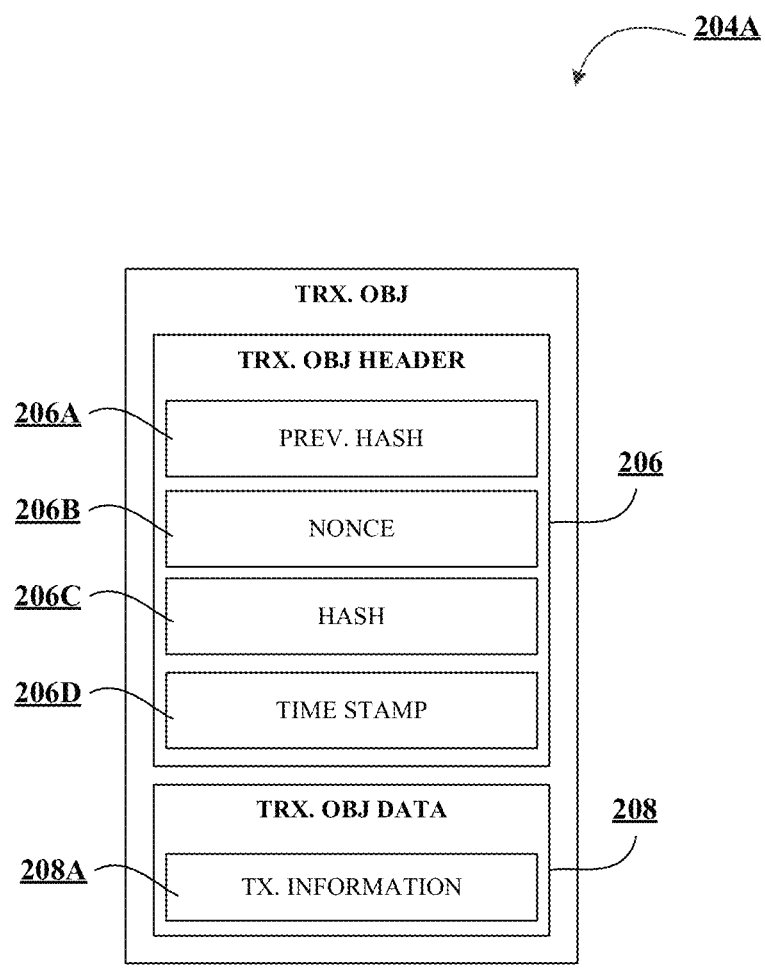
Figure 3:
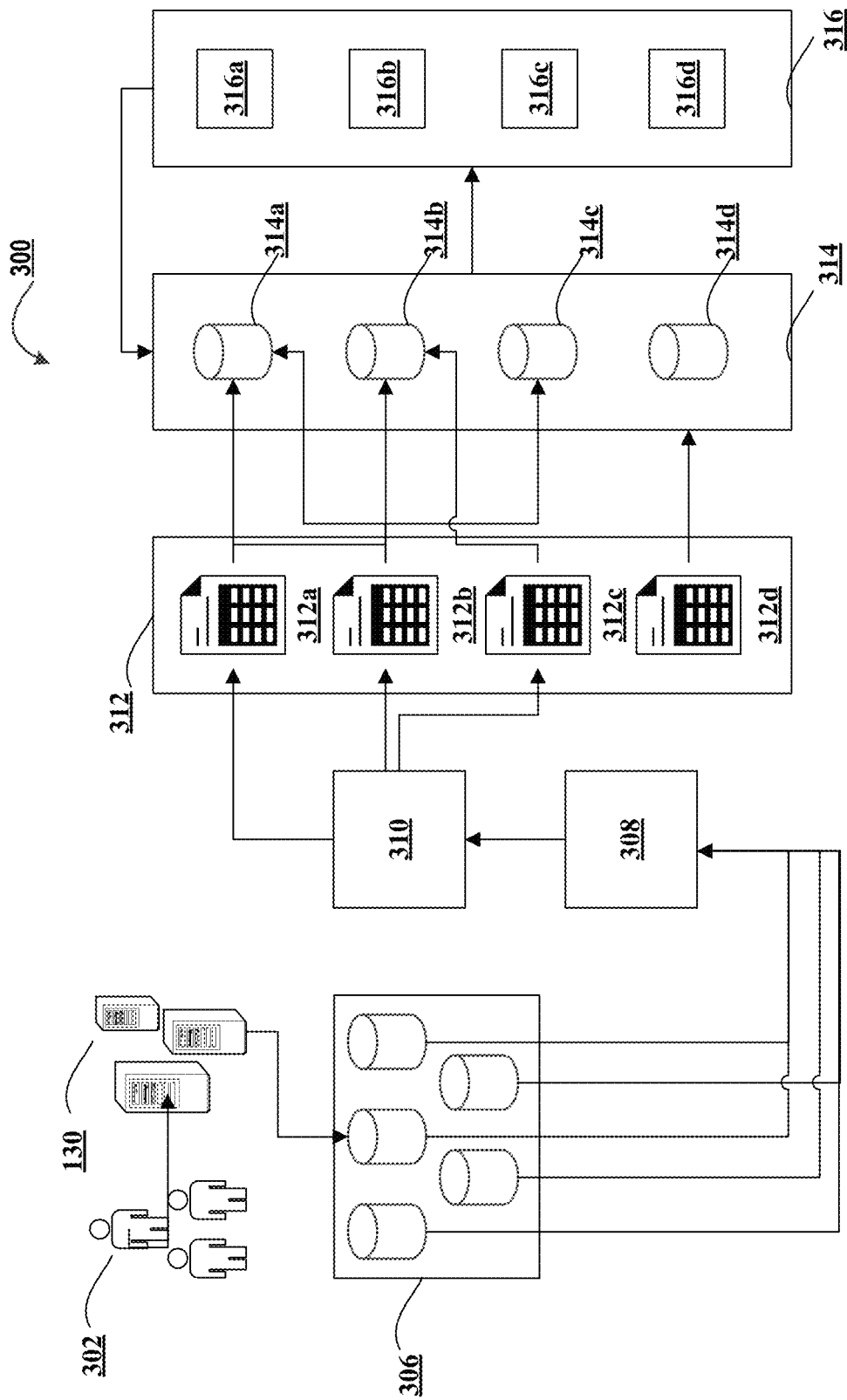
Figure 4A:
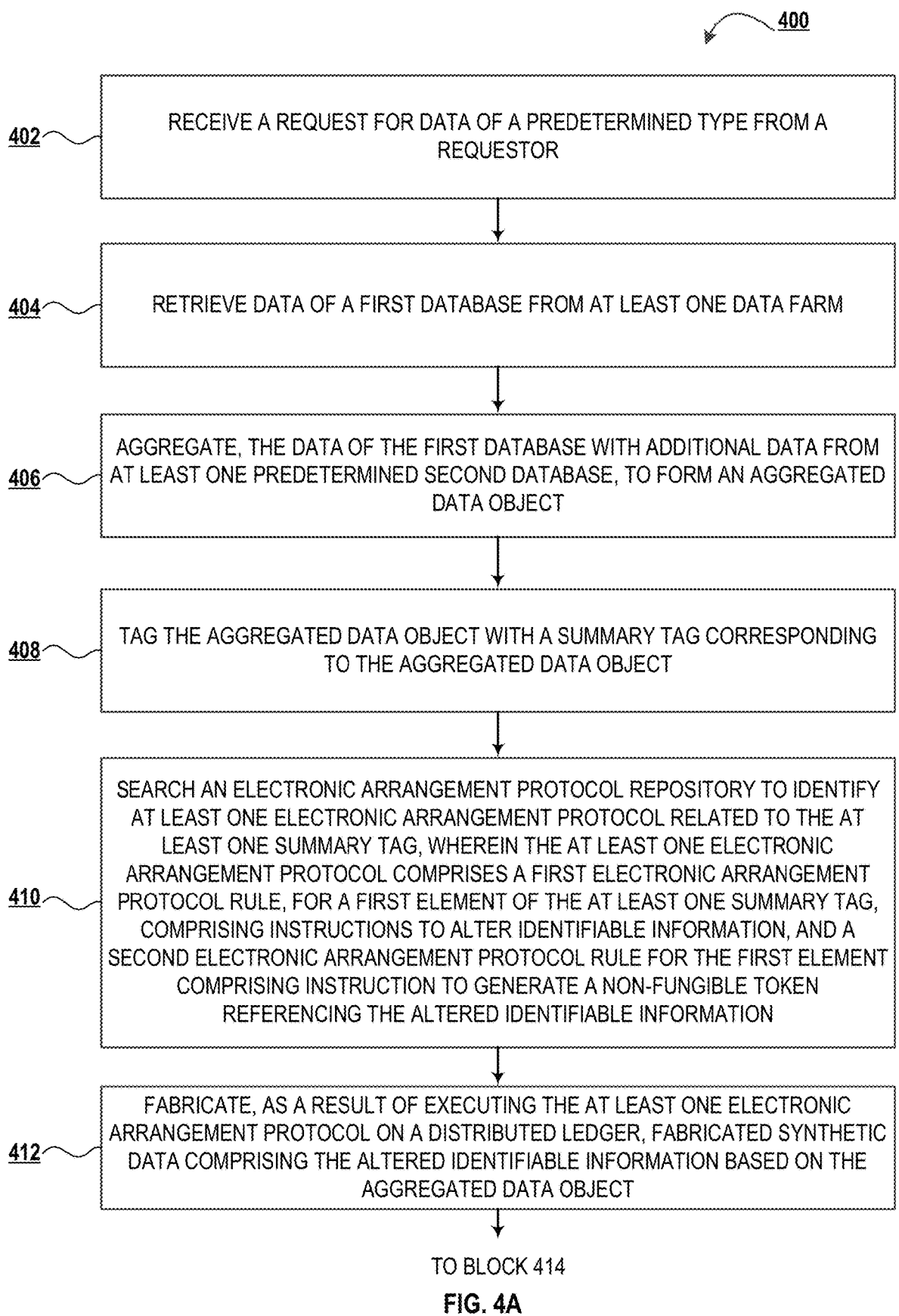
Figure 4B:
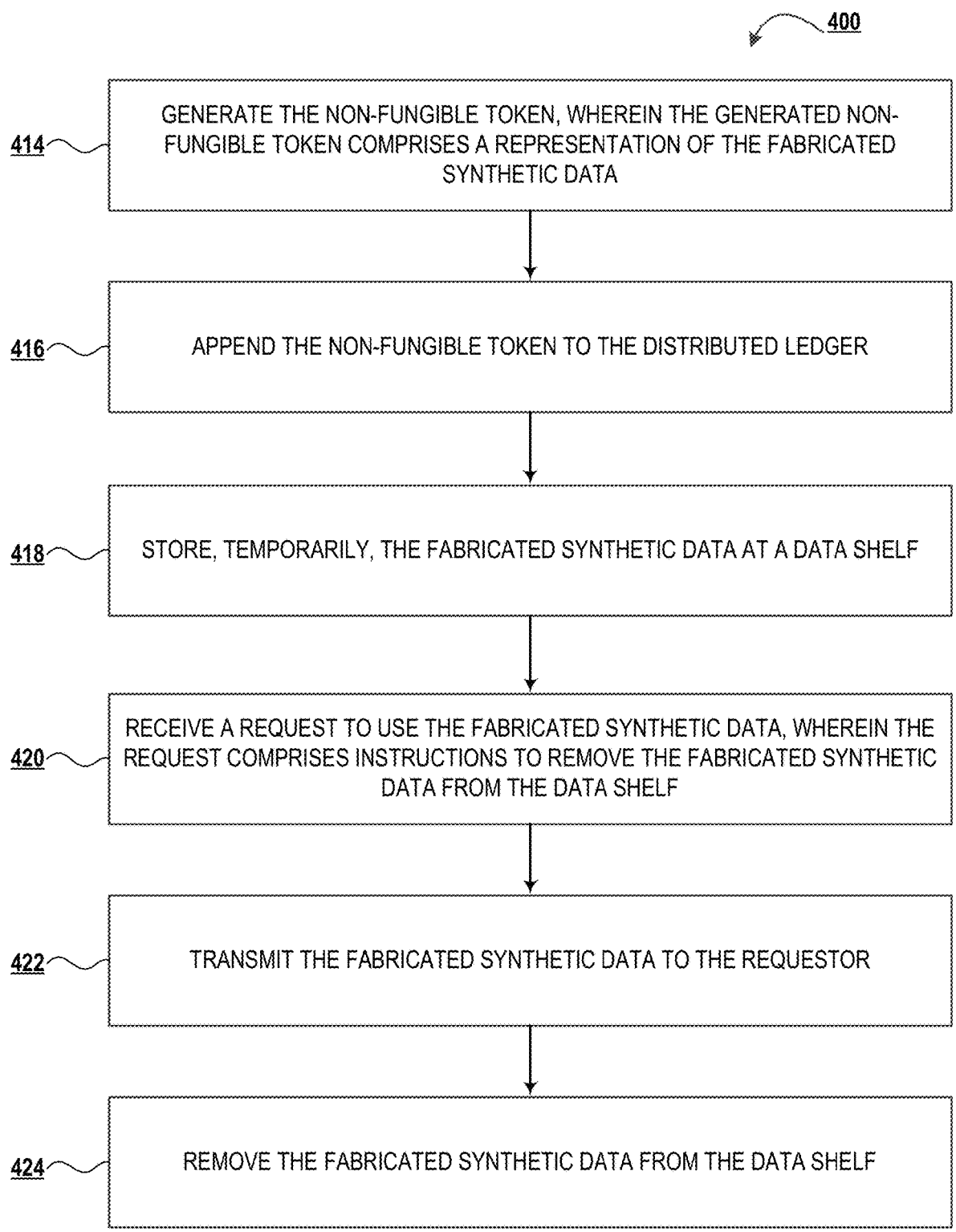

FIGS. 1A-1C illustrates technical components of an exemplary distributed computing environment for altered data generation and transient use via electronic arrangement protocols, in accordance with an implementation of the disclosure;

FIGS. 2A-2B illustrate an exemplary distributed ledger technology (DLT) architecture, in accordance with an implementation of the disclosure;

FIG. 3 illustrates a graphical architectural representation of altered data generation and transient use via electronic arrangement protocols, in accordance with an implementation of the disclosure; and FIGS. 4A-4B illustrate a process flow for altered data generation and transient use via electronic arrangement protocols, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be embodied in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "electronic arrangement protocol" may refer to a smart contract that operates as a self-executing code stored on a blockchain network. This code may contain predefined rules and conditions agreed upon by the involved parties. When these conditions are met, the electronic arrangement protocol automatically executes the agreed-upon actions without requiring human intervention. Electronic arrangement protocols are immutable, transparent, and tamper-resistant, and provide for improved trust and efficiency in applications such as computing, finance, supply chain management, and decentralized applications (DApps). These electronic arrangement protocols may use cryptographic techniques to provide security and reliability as a decentralized alternative to traditional agreements.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a element matches a predetermined criterion, including that a threshold has been met, passed, exceeded, and so on.

The technical problem lies in the necessity to analyze diverse user data to enhance the services of an entity and prevent malicious activities, all while upholding personal data protection. Although the benefit of using such user data is to provide a more diverse and effective range of products, the traditional methods rely on direct utilization of customer data, which poses privacy concerns. Moreover, generating test data is resource-intensive and consumes significant storage space, which potentially compromises data security while also decreasing operational efficiency.

Existing approaches use aggregated data, which, while aiming to mitigate privacy vulnerabilities, often lacks the granularity needed for accurate predictions and threat detection. Furthermore, the resource-intensive nature of test data generation further exacerbates the challenge, straining storage space and computational resources without addressing privacy concerns or optimizing efficiency.

Addressing these challenges necessitates the establishment of a system and method for altered data generation and transient use via electronic arrangement protocols. Such a framework allows for the generation of synthetic data in a manner that provides data similar to that of real-world data without sacrificing the privacy of the users underlying the real-world data. To do so, electronic arrangement protocols modify the real-world data in real time to obfuscate or mask sensitive information. A request for a specific type of data is received, for example, customer data for training a model. Data is sourced from a data farm and may be mixed (e.g., aggregated, collated, etc.). The data is tagged with tags that correspond to the type of data therein, or category. After tagging, the electronic arrangement protocols on the electronic arrangement protocol rack are searched based on the tags. Thereafter, based on these tags and the rules of each electronic arrangement protocol of the electronic arrangement protocol rack, synthetic data is fabricated, which may involve combining and/or generating of the synthetic data. The synthetic data is then provided to a "data shelf", as a temporary location for the desired activity or process to have access to the synthetic data for the desired use. This activity or process may be executed, followed by an express removal of the synthetic data from the data shelf. By avoiding the requirement for storing the data, the system not only protects sensitive information, but also provides for a reduction in energy consumption.

What is more, the present disclosure provides a technical solution to a technical problem. As described herein, the technical problem includes the need for an effective data generation solution to provide realistic data for accurate computer model learning and improvement purposes, while also resolving data privacy concerns that elude traditional systems. The present disclosure embraces an improvement over existing synthetic data generation solutions by (i) with fewer steps to achieve the solution, thus reducing the amount of network resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving network resources, (iv) determining an optimal amount of resources that need to be used to implement the solution, thus reducing network traffic and load on existing network resources. Furthermore, the technical solution described herein uses a rigorous, computerized process to perform specific tasks and/or activities that were not previously performed. In specific implementations, the technical solution bypasses a series of steps previously implemented, thus further conserving network resources.

FIGS. 1A-1C illustrate technical components of an exemplary distributed computing environment 100 for altered data generation and transient use via electronic arrangement protocols, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive service from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one implementation includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an implementation of the disclosure. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses electronic arrangement protocols (i.e., "smart contracts"). Electronic arrangement protocols are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some implementations, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B-a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates a graphical representation of altered data generation and transient use via electronic arrangement protocols, in accordance with an implementation of the disclosure.

As shown in FIG. 3, a user, entity, or endpoint device (i.e., a "requestor") 302 may transmit a request for data of a predetermined type to the system 130. Thereafter, depending on the type of data requested, the system 130 may transmit data from a data farm 306 containing at least one database to a data mixer 308. The data mixer 308 may aggregate data from one or more databases of the data farm 306. This aggregated data object may then be tagged by a tagging module 310, as will be described in detail herein with respect to block 408 of FIG. 4A. Next, an electronic arrangement protocol rack 312 may be searched/queried for electronic arrangement protocols that relate to the tag(s). For example, electronic arrangement protocol 312a may be related to customer records, with a records element therein. Electronic arrangement protocol 312b may be related to customer financial, with a financial element therein. Electronic arrangement protocol 312c may be related to customer malfeasance, with a malfeasance element therein. Electronic arrangement protocol 312d may be related to customer contact elements, with a customer contact element therein. Indeed, any number of electronic arrangement protocols are contemplated, each having one or more elements therein related thereto.

One or more of the electronic arrangement protocols 312a-312d on the electronic arrangement protocol shelf 312 may then be executed, which fabricates synthetic data (i.e., fabricated synthetic data). This fabricated synthetic data may then reside on a data shelf 314 (i.e., a fabricated synthetic data shelf). The data shelf 314 may include one or more fabricated synthetic data groups 314a-314d, where each fabricated data group contains fabricated synthetic data resulting from the execution of at least one of the electronic arrangement protocols 312a-312d. Each of the fabricated synthetic data groups 314a-314d corresponds to the type of data originally requested by the requestor 302. For example, fabricated synthetic data group 314a may correspond to a request for customer records, thus the fabricated synthetic data group 314a may contain fabricated customer records. Fabricated synthetic data group 314b may correspond to a request for customer financials, thus the fabricated synthetic data group 314b may contain fabricated customer financials. Fabricated synthetic data group 314c may correspond to a request for customer malfeasance data, thus the fabricated synthetic data group 314c may contain fabricated customer malfeasance data. Indeed, any number of fabricated synthetic data groups are contemplated.

Thereafter, the fabricated synthetic data group (e.g., the fabricated synthetic data) may be transmitted to the entity, user, endpoint device that requested the fabricated synthetic data. In doing so, the fabricated synthetic data may be used for any number of activities 316. For example, activity 316a may include malfeasance prediction applications. Activity 316b may include user acceptance testing or other software development. Activity 316c may include production scenario replication. Activity 316d may include lead generation. Indeed, there are numerous activities and uses for the fabricated synthetic data, including machine learning model training, data privacy protection, software testing, and so forth. Once the fabricated synthetic data has been transmitted for use by such activities 316, the fabricated synthetic data (or fabricated synthetic data group) may be removed from the data shelf 314.

FIGS. 4A and 4B illustrate a process flow for altered data generation and transient use via electronic arrangement protocols, in accordance with an implementation of the disclosure. At FIG. 4A, the process may begin at block 402, where the system 130 receives a request for data of a predetermined type from a requestor. A request will be received by the system 130, made by a requestor, for specific data housed within a data farm. This request may be for data including customer characteristics, business characteristics, investment-related data, credit card information, and assorted customer malfeasance data, and so forth, for analytical purposes or other objectives. The data sourced from the data farm may serve various analytical applications, including the development of predictive models. These predictive models may be used for targeted marketing strategies tailored to specific consumer groups, construction of business characteristics models, creation of vulnerability assessment models to improve investment decisions, creation of malfeasance detection models, and so forth.

Next, at block 404, the system 130 may retrieve data of a first database from the at least one data farm. Based on the type of data requested in block 402 (e.g., customer characteristics, business characteristics, investment-related data, credit card information, and assorted customer malfeasance data, and so forth), the system 130 will retrieve data from a particular database.

As used herein, a "database" (e.g., a "first database" or a "second database") may refer to a repository of a specific type of data. For example, one database may refer to data that contains customer and/or business characteristics. Another database may refer to data that contains a user accounts. Yet another database may refer to user's credit details. Numerous other databases may be used, for example, customer malfeasance, investment accounts, personal contact information, social security numbers, and so forth.

Query routing may be used to direct requests/queries to the appropriate database based on predefined rules or algorithms. This method selects the database that contains the most relevant data for fulfilling the request. Additionally, or alternatively, metadata management techniques may be used. This may involve the metadata associated with each database, including data type, structure, and relevance to specific use cases. By analyzing this metadata, the system 130 may determine the characteristics and content of each database and route the retrieval query accordingly.

At block 406, the system 130 may then aggregate, the data of the first database with additional data from at least one predetermined second database, to form an aggregated data object.

It shall be appreciated that some data is often closely associated with other data, where only one type of data by itself would not be useful for purposes of training models or otherwise using data. For example, customer characteristics may not be useful by itself, but it may prove to be useful when combined with customer credit details or mortgage details. Indeed, a combination of such data may reveal inferences such as financial stability, outstanding obligations, spending habits, likelihood of nonpayment of loans, vulnerability assessment for lending, targeted marketing strategies, and overall consumer behavior patterns. Additionally, such combined data may highlight trends in home-ownership rates, regional economic disparities, and the impact of interest rates on borrowing behavior.

Thus, once data is retrieved from the first database in block 404, the system 130 may recognize that corresponding related data should be retrieved from a second database. These relationships may be predetermined and programmed into the instructions executed by the system 130. For example, it may be predetermined that any time data from database A is retrieved, data from database B is also retrieved. Or it may be predetermined that any time data from database A is retrieved, data from databases B and C are retrieved.

Thus, the combination of data from two or more databases may be aggregated to form a data object known as an aggregated data object. However, in some implementations, only data from one database may be used. Such implementations will still be described herein as an aggregated data object, for purposes of brevity.

In some implementations, aggregating may include mixing data of a plurality of data types. Data may be mixed (e.g., merged, collated, etc.) by various join or union/concatenation operations or commands. In some implementations, data may be transformed to a standardized format if necessary. The aggregated data object may then contain the combined data, and thus different elements or characteristics, present across the mixed databases. This allows for better decision-making and analysis of trends or patterns that may not be apparent when examining each database in isolation.

Next, at block 408, the system 130 may tag the aggregated data object with at least one summary tag corresponding to the aggregated data object. The aggregated data object undergoes tagging based on its contents. For example, data from Database A may be associated with tags like "customer type," "purchase history," or "geographical location." These tags are applied programmatically or through user-defined rules by analyzing the data to identify attributes. Data from Database B may be tagged with "category," "price range," or "availability." In some implementations, the tagging process may occur as a result of parsing the data for relevant information and associating it with predefined elements. In other implementations, tags may be applied as a direct result of retrieval of data from a particular database, via a real-time tagging process.

It shall be appreciated that data retrieved from a database may have multiple categories. For example, data of the type related to credit information may contain a credit rating, date of birth, a name, a social security number, and so forth. Thus, in some implementations all of the data from a first database may be provided the same summary tag. This summary tag, however, may contain additional information, referred to herein as "elements". These elements, for example a first element, provide more granular detail into the contents of the aggregated data object. Numerous elements are contemplated, any of which may indicate that a particular aggregated data object contains a certain type of sensitive information. Examples of sensitive information include account numbers, personal identification numbers, credit ratings, street address, phone number, and so forth. In the aforementioned example, the first element may indicate that a social security number is contained therein. Thus, the at least one summary tag may include a first element, or any number of elements.

Next, at block 410, the system 130 may search an electronic arrangement protocol repository to identify at least one electronic arrangement protocol related to the at least one summary tag, or, in some implementations, at least one electronic arrangement protocol related to at least one element of the at least one summary tag.

A plurality of electronic arrangement protocols (not executed) may exist within a "rack" or an electronic arrangement protocol repository, each electronic arrangement protocol having specialized instructions regarding how to handle data from each database. Thus, electronic arrangement protocols are identified that are (i) specific to the summary tag (e.g., the database from which data was retrieved, and/or (ii) specific to the elements of the data retrieved as indicated within the summary tag.

These identified electronic arrangement protocols contain rules. Importantly, for a given first element, the electronic arrangement protocols contain a first electronic arrangement protocol rule having instructions to alter identifiable information. For example, if a first element indicates that data contains a phone number, the first electronic arrangement protocol rule may provide instructions to rearrange the digits of the phone number. For instance, if the original number is "123-456-7890," the digits may be shuffled to create a new number like "901-234-5678." Additionally, or alternatively, the first electronic arrangement protocol rule may provide instructions to replace certain digits with placeholders, such as "X" or "0." For instance, "123-456-7890" could become "XXX-XXX-XXXX" or "000-000-0000." Additionally, or alternatively, the first electronic arrangement protocol rule may provide instructions to maintain the same area code and prefix but modify the last four digits. For example, "123-456-7890" might transform into "123-456-XXXX." Additionally, or alternatively, the first electronic arrangement protocol rule may provide instructions to encrypt the original phone number into a ciphertext using an algorithm and a key pair.

For a given first element, the electronic arrangement protocols may also contain a second electronic arrangement protocol rule for the first element comprising instruction to generate a non-fungible token ("NFT"). An electronic arrangement protocol governing the creation of an NFT may incorporate a rule whereby the execution of another process such as the generating of synthetic data triggers the creation of an NFT alongside the data. Upon the successful execution of the specified process, the electronic arrangement protocol may be programmed to append a record of the creation of this synthetic data to the NFT. This record may include pertinent details such as the element name, date, time of creation, and any other relevant metadata. Alternatively, in certain implementations, the NFT itself may contain a portion or representation of the fabricated synthetic data, which provides verification of data authenticity and origin.

In some implementations, the at least one summary tag further may include a second element. For example, while the first element may be a phone number that needs to be altered during execution of the electronic arrangement protocol, the second element may be another piece of sensitive and/or personal identifiable information. Personal identifiable or sensitive information includes but is not limited to: full name, date of birth, social security number, driver's license number, passport number, financial account numbers, credit card numbers, home address, email address, clinical history, genetic information, username and password combinations, IP address, geolocation data, or the like.

In some implementations, the at least one electronic arrangement protocol further may include a third electronic arrangement protocol rule, the third electronic arrangement protocol rule comprising instructions to alter identifiable information of the second element. As one non-limiting example, if the second element is date of birth, one method to alter Date of Birth data may be to apply a random offset to the original dates. Executing the rules could generate altered dates by increasing or decreasing the month, day, or year. A Date of Birth of Jan. 1, 1990 may be altered to show Feb. 1, 1990. Additionally, or alternatively, Date of Birth may be truncated to a less precise level, such as only the year or the year and month. For instance, instead of recording the exact date of birth, the system 130 could represent it as simply "1990" or "January 1990." Alternatively, masking techniques may be used where portions of the Date of Birth are replaced with placeholder characters, such as by replacing a Date of Birth of "Jan. 1, 1990" with "XX/01/19XX".

Continuing at block 412, the system 130 may then fabricate, as a result of executing the at least one electronic arrangement protocol on a distributed ledger, fabricated synthetic data comprising the altered identifiable information based on the aggregated data object. In other words, at least one rule of at least one electronic arrangement protocol is executed, which causes synthetic data (e.g., the data that results from the altering of the data within the aggregated data object) to be generated. The data within the aggregated data object is altered, such as to represent the underlying data but not contain any sensitive information.

At block 414, the system 130 may generate the non-fungible token as a result of executing at least one rule of at least one electronic arrangement protocol. This rule may implement a minting function for token creation within the electronic arrangement protocol, where specific details such as token ID, metadata, and ownership details are defined. In some implementations, the electronic arrangement protocol may implement a proof-of-work or proof-of-stake mechanism that requires users to perform computational tasks or stake resources to mint new tokens. Such activities add security to the process. In addition, each token is traceable in immutable, which ultimately provides for a record of any data that is generated.

In some implementations, the generated non-fungible token may include a representation of the fabricated synthetic data, for example by metadata stored on a distributed ledger and linked to the token. In other implementations, the token may include a reference number that acts as a pointer to a database located external to the distributed ledger. On such a database, additional details of the data from the first, and/or second, and so forth databases that form the basis of the data prior to the alteration thereof. While these additional details may not contain personally sensitive or identifiable information, reference to creation timestamps, location, database name, and so forth may be made for tracking purposes, should an audit of the origination of the generated synthetic data need to occur.

Next, at block 416, the non-fungible token is appended to the distributed ledger. This may occur as a result of executing at least one rule of at least one electronic arrangement protocol.

Simultaneously, or prior, or after the operations of block 416, at block 418 the system 130 may store, temporarily, the fabricated synthetic data at a data shelf. This fabricated (i.e., synthetic) data, although having been altered and no longer containing personally identifiable information or sensitive information, may still need to be protected and not accessible over long periods of time. In this way, future malfeasant actors equipped with technologies not yet understood at the time of this disclosure may not be able to reverse-engineer or otherwise discover the sensitive information that forms the basis of this fabricated synthetic data.

Additionally, by not requiring the long-term storage of such data, the transmission of such data, or the like, the system 130 consumes less energy and therefore reduces environmental footprints such as carbon emissions, heat emissions, and so forth.

Next, at block 420, the system 130 receives a request to use the fabricated synthetic data. In some implementations, this request may be transmitted to the system 130 by the requestor as a separate request. In some implementations, this request may be automatically provided as a result of the initiating of the training of a machine learning model, such as by integrating an API call within the training pipeline to trigger the transmission of the request. Accordingly, the training script may include logic to evoke the API call to send the request to the system 130.

In other implementations, the request to use the fabricated synthetic data may be inherently assumed by the system 130 such that an explicit request is not necessary. Instead, once the non-fungible token has been appended to the distributed ledger, or after the synthetic data has been fabricated based on the aggregated data object using the at least one electronic arrangement protocol, the system 130 may automatically proceed to transmitting the fabricated synthetic data to the requestor (as will be described with respect to block 422) that originally provided the request for the data in block 402.

The request, or actions amounting to a request (as described in the foregoing paragraphs), to use the fabricated synthetic data may include instructions to remove the fabricated synthetic data from the data shelf. The data shelf, as described with respect to block 418, serves only as a temporary repository for the synthetic data fabricated to be placed prior to its usage. Thus, upon the intended use of such synthetic data, the synthetic data will be removed and space on the shelf will remain for subsequent related or unrelated synthetic data after fabrication thereof.

At block 422, the system 130 transmits the fabricated synthetic data. This transmitting of the fabricated synthetic data occurs to send the fabricated synthetic data to the requestor (e.g., entity, endpoint device, or otherwise) that requested the data in block 402.

In some implementations, transmitting the fabricated synthetic data to the requestor may include sending the fabricated synthetic data as data packets over an API call. The fabricated synthetic data may be sent over an API call (for example, a Representational State Transfer, or "REST" API) by including the fabricated synthetic data in the request body or as query parameters. In the request body, the data may be formatted in JSON or XML. In other words, in some implementations, the fabricated synthetic data may be encapsulated in a JSON data packet. In some alternative implementations, the fabricated synthetic data may be sent using protocols like Simple Object Access Protocol ("SOAP") or GraphQL.

Next, at block 424, the system 130 may remove the fabricated synthetic data from the data shelf. Indeed, as a result of the request to use the fabricated synthetic data, and the subsequent transmission thereof, the fabricated synthetic data may be removed entirely from the data shelf to therefore remove any remnants of the fabricated synthetic data from the data shelf. In doing so, no fabricated synthetic data remains anywhere except for the entity or endpoint device that originally requested the data, therefore preventing misuse and eliminating the need for long-term storage of such fabricated synthetic data.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for altered data generation and transient use via electronic arrangement protocols, the system comprising:
   a processing device;
   a non-transitory storage device containing instructions when executed by the processing device, causes the processing device to perform the steps of:
      receiving a request for data of a predetermined type from a requestor;
      retrieving data of a first database from at least one data farm;
      aggregating, the data of the first database with additional data from at least one predetermined second database, to form an aggregated data object;
      tagging the aggregated data object with at least one summary tag corresponding to the aggregated data object;
      searching an electronic arrangement protocol repository to identify at least one electronic arrangement protocol related to the at least one summary tag, wherein the at least one electronic arrangement protocol comprises a first electronic arrangement protocol rule, for a first element of the at least one summary tag, comprising instructions to alter identifiable information, and a second electronic arrangement protocol rule for the first element comprising instruction to generate a non-fungible token referencing the altered identifiable information;
      fabricating, as a result of executing the at least one electronic arrangement protocol on a distributed ledger, fabricated synthetic data comprising the altered identifiable information based on the aggregated data object;
      generating the non-fungible token, wherein the generated non-fungible token comprises a representation of the fabricated synthetic data; and
      appending the non-fungible token to the distributed ledger.

2. The system of claim 1, wherein the instructions further cause the processing device to perform the steps of:
   storing, temporarily, the fabricated synthetic data at a data shelf;
   receiving a request to use the fabricated synthetic data, wherein the request comprises instructions to remove the fabricated synthetic data from the data shelf;
   transmitting the fabricated synthetic data to the requestor; and
   removing the fabricated synthetic data from the data shelf.

3. The system of claim 1, wherein the at least one summary tag further comprises a second element.

4. The system of claim 3, wherein the at least one electronic arrangement protocol further comprises a third electronic arrangement protocol rule, the third electronic arrangement protocol rule comprising instructions to alter identifiable information of the second element.

5. The system of claim 1, wherein aggregating comprises mixing data of a plurality of data types.

6. The system of claim 1, wherein transmitting the fabricated synthetic data to the requestor comprises sending the fabricated synthetic data as data packets over an API call.

7. The system of claim 6, wherein the fabricated synthetic data is encapsulated in a JSON data packet.

8. A computer program product for altered data generation and transient use via electronic arrangement protocols, the computer program product comprising a non-transitory computer-readable medium comprising code causing an apparatus to:
   receive a request for data of a predetermined type from a requestor;
   retrieve data of a first database from at least one data farm;
   aggregate, the data of the first database with additional data from at least one predetermined second database, to form an aggregated data object;
   tag the aggregated data object with at least one summary tag corresponding to the aggregated data object;
   search an electronic arrangement protocol repository to identify at least one electronic arrangement protocol related to the at least one summary tag, wherein the at least one electronic arrangement protocol comprises a first electronic arrangement protocol rule, for a first element of the at least one summary tag, comprising instructions to alter identifiable information, and a second electronic arrangement protocol rule for the first element comprising instruction to generate a non-fungible token referencing the altered identifiable information;
   fabricate, as a result of executing the at least one electronic arrangement protocol on a distributed ledger, fabricated synthetic data comprising the altered identifiable information based on the aggregated data object;
   generate the non-fungible token, wherein the generated non-fungible token comprises a representation of the fabricated synthetic data; and
   append the non-fungible token to the distributed ledger.

9. The computer program product of claim 8, wherein the non-transitory computer-readable medium further comprises code causing the apparatus to:
   store, temporarily, the fabricated synthetic data at a data shelf;
   receive a request to use the fabricated synthetic data, wherein the request comprises instructions to remove the fabricated synthetic data from the data shelf;
   transmit the fabricated synthetic data to the requestor; and
   remove the fabricated synthetic data from the data shelf.

10. The computer program product of claim 8, wherein the at least one summary tag further comprises a second element.

11. The computer program product of claim 10, wherein the at least one electronic arrangement protocol further comprises a third electronic arrangement protocol rule, the third electronic arrangement protocol rule comprising instructions to alter identifiable information of the second element.

12. The computer program product of claim 8, wherein aggregating comprises mixing data of a plurality of data types.

13. The computer program product of claim 8, wherein transmitting the fabricated synthetic data to the requestor comprises sending the fabricated synthetic data as data packets over an API call.

14. The computer program product of claim 13, wherein the fabricated synthetic data is encapsulated in a JSON data packet.

15. A method for altered data generation and transient use via electronic arrangement protocols, the method comprising:
receiving a request for data of a predetermined type from a requestor;
retrieving data of a first database from at least one data farm;
aggregating, the data of the first database with additional data from at least one predetermined second database, to form an aggregated data object;
tagging the aggregated data object with at least one summary tag corresponding to the aggregated data object;
searching an electronic arrangement protocol repository to identify at least one electronic arrangement protocol related to the at least one summary tag, wherein the at least one electronic arrangement protocol comprises a first electronic arrangement protocol rule, for a first element of the at least one summary tag, comprising instructions to alter identifiable information, and a second electronic arrangement protocol rule for the first element comprising instruction to generate a non-fungible token referencing the altered identifiable information;
fabricating, as a result of executing the at least one electronic arrangement protocol on a distributed ledger, fabricated synthetic data comprising the altered identifiable information based on the aggregated data object;
generating the non-fungible token, wherein the generated non-fungible token comprises a representation of the fabricated synthetic data; and
appending the non-fungible token to the distributed ledger.

16. The method of claim 15, further comprising:
storing, temporarily, the fabricated synthetic data at a data shelf;
receiving a request to use the fabricated synthetic data, wherein the request comprises instructions to remove the fabricated synthetic data from the data shelf;
transmitting the fabricated synthetic data to the requestor; and
removing the fabricated synthetic data from the data shelf.

17. The method of claim 15, wherein the at least one summary tag further comprises a second element.

18. The method of claim 17, wherein the at least one electronic arrangement protocol further comprises a third electronic arrangement protocol rule, the third electronic arrangement protocol rule comprising instructions to alter identifiable information of the second element.

19. The method of claim 15, wherein transmitting the fabricated synthetic data to the requestor comprises sending the fabricated synthetic data as data packets over an API call.

20. The method of claim 19, wherein the fabricated synthetic data is encapsulated in a JSON data packet.

* * * * *